United States Patent Office 3,382,116
Patented May 7, 1968

3,382,116
POLYISOCYANURATE SOLID SOLUTIONS WITH OXIDANT OF LITHIUM PERCHLORATE
Lucius G. Gilman, Wakefield, and Robert I. Lait, Swampscott, Mass., assignors to Monsanto Research Corporation, St. Louis, Mo., a corporation of Delaware
No Drawing. Filed July 2, 1962, Ser. No. 207,467
10 Claims. (Cl. 149—19)

This invention relates to lithium perchlorate, and more particularly, provides novel polymeric solid solutions of lithium perchlorate wherein the polymer and perchlorate are combined in the same homogeneous phase, and novel methods of making the same.

Conventional composite solid propellant compositions generally consist of an inorganic oxidant and a plastic binder, which also serves as the reductant-fuel of the system. The aforesaid system is a heterogeneous composition wherein the burning rate and stability to detonation are dependent to some extent upon the particle size of the oxidant. The former property is improved as the particle size of the oxidant is reduced, but milling to provide a finely divided oxidant is hazardous and periodic explosions are encountered.

Dissolving the oxidant in the binder provides the oxidant in a state of subdivision finer than any grinding can produce, and avoids the hazards of milling.

Putting the oxidant into the same phase as the binder also raises the available solids loading of the composition. There is a limit to the solids loading for a given amount of binder, above which not enough binder will be available to form a continuous phase binding the discontinuous solids phase into a unitary structure. In the conventional composite propellant, the solids phase includes oxidant for the binder. To the extent that the binder phase includes oxidant for itself, available solids loading is freed for inclusion of other energetic components.

Various methods of making polymeric solid solutions of lithium perchlorate and the products thereof are described and claimed in presently copending applications. Thus, as described in S.N. 207,466 filed concurrently herewith by Lucius G. Gilman and Robert I. Lait, now Patent No. 3,236,705, lithium perchlorate has been found soluble in an olefinic monomer such as acrylamide, and polymerization of the olefin in the presence of dissolved perchlorate is found to produce polymeric solid perchlorate solutions. As described in S.N. 207,470, fined concurrently herewith by Lucius G. Gilman and Robert I. Lait, lithium perchlorate has also been found to be very soluble in a polyfunctional compound having active hydrogen groups such as amino and hydroxy, and this polyfunctional compound, it has been found, can be polymerized by reaction with a second polyfunctional monomer such as a diisocyanate to produce polymeric solid perchlorate solutions.

Each of the stated approaches employ monomers having solvent power for lithium perchlorate.

The polyisocyanates are also monomers from which polymers can be prepared, but these do not have any significant solvent power for lithium perchlorate. In making a polyurethane or polyurea by the above-stated method using two polyfunctional monomers, it is the active hydrogen monomer which will dissolve the perchlorate in the monomer system, and not the diisocyanate to any significant extent.

It is an object of this invention to provide novel compositions comprising polymeric solid solutions of lithium perchlorate wherein the polymer and perchlorate are combined in the same homogeneous phase, and novel methods of making the same.

A particular object of this invention is to provide a novel and advantageous method of making the stated compositions, wherein a monomer lacking solvent power for lithium perchlorate is polymerized in the presence of dissolved lithium perchlorate.

Another object is to provide novel compositions comprising polymeric solid solutions of lithium perchlorate wherein the polymer and perchlorate are combined in the same homogeneous phase, in which the polymer has particularly good thermal properties.

These and other objects will become evident from a consideration of the following specification and claims.

It has now been found that polymerization of an isocyanate monomer can be effected in the presence of an oxidant amount of lithium perchlorate dissolved in an inert organic solvent to produce polymeric solid solutions of lithium perchlorate wherein the polymer and oxidant amounts of the perchlorate are combined in the same homogeneous phase.

Thus, in accordance with this invention, the use of a monomer having solvent power for lithium perchlorate such as the olefinic and the active hydrogen polyfunctional monomers of the above-discussed copending applications becomes unnecessary.

In practicing the present method, for example, the perchlorate can be combined with an isocyanate, and the isocyanate polymerized to a polyisocyanurate. Even though there is no dissolution of lithium perchlorate in the monomeric isocyanate, it is found that in the product, the perchlorate is in solution in the polymer, with the perchlorate and the polymer in the same homogeneous phase.

The polymeric solid solutions which can be prepared by the stated methods are especially advantageous because of their excellent thermal properties. The polyisocyanurates have melting and decomposition temperatures which are unusually high for an organic polymer. In propellant compositions, melting and slumping of the burning mass interferes with maintenance of its shape during firing, which in turn interferes with desired control of its burning rate. It is desirable, therefore, for the polymeric binder including the dissolved lithium perchlorate to be high melting, as the present compositions provide.

As will become evident hereinafter, the present invention is not limited in the products it provides to those prepared by the novel method stated above, using a solvent in the monomeric system. The polymeric solid solutions of an oxidant amount of lithium perchlorate in a polyisocyanurate can also be prepared by other methods such as solution of the perchlorate in a melt or solution of the preformed polymer. The presently provided method is, however, advantageously easily practiced.

The products of this invention, whether prepared by the stated method of polymerizing in the presence of dissolved lithium perchlorate or by dissolving lithium perchlorate in preformed polymer, comprise polymeric solid solutions of an oxidant amount of lithium perchlorate and polymer, of the above stated nature, in the same homogeneous phase.

By solid solution is meant that the perchlorate and the polymer are homogeneously mixed and in the same phase, to the extent that heterogeneity therebetween is not evident on examination under an occular microscope.

By a polymeric binder is meant a matrix comprising polymer having a molecular weight at least sufficient to make the polymer solid at room temperature. It is undesirable to have the molecular weight so high that the polymer is infusible and insoluble. Preferably, the product will be sufficiently elastomeric to have a tensile strength of at least 50 pounds per square inch (p.s.i.) and ultimate elongation (at break) of at least 20%.

The perchlorate must be anhydrous, containing less than about 0.5 mole percent water, and in references to it, it is to be understood that anhydrous perchlorate is meant.

By an oxidant amount of the perchlorate is meant enough to supply the combustion oxidation requirements of a significant portion, which will be at least about half the oxidation requirements, of the polymer. Lithium perchlorate, $LiClO_4$, decomposes to $LiCl$ and 2 moles of oxygen molecules per mole of perchlorate. Thus referring for example to oxidation of polymers including $CH_2$ and like hydrocarbon units, if the C atom forms CO and the hydrogen atoms form water, respectively, as gaseous oxidation products, the consumption of oxidant is 0.5 mole of lithium perchlorate per mole of methylene units so oxidized. Under certain conditions the hydrogen is not oxidized or is oxidized in part but a corresponding amount of a metal is. Thus the ratio of perchlorate to polymer to supply the oxidation requirements will be at least about 0.50 mole per mole of reduced carbon atoms in the polymer. To attain the benefits of this invention, at least half of this consumption requirement is supplied by dissolved lithium perchlorate in the same homogeneous phase as the polymer.

Preferably, all the oxygen requirement for oxidation of the polymer is supplied by dissolved lithium perchlorate, and still more preferably, more than half and desirably all the oxygen requirement of the total composition is supplied by such perchlorate.

The present compositions may consist essentially or entirely of the polymer and lithium perchlorate. Such compositions are monopropellants which can be employed as such to produce propellant gases for rockets and the like by burning and explosive forces on ignition in an enclosed space.

As will appear hereinafter, however, it is desirable to include other components in the composition. These may either be part of the same binder phase as the polymer, or part of the discontinuous solids phase combined with the binder. These may includes fuels and oxidants, as further pointed out hereinafter. If these other compounds are fuels, they consume oxygen, and thus increase the total oxygen requirement of the composition. Where additional oxidant is included, the lithium perchlorate need not supply all the oxidant requirements of the composition, but to adapt the composition for propellant and fuel use, it is necessary that the composition include sufficient total oxidant to render combustion of the system self-supporting.

The quantity of lithium perchlorate desired in the final solid propellant composition will thus vary depending on the particular selection of ingredients. It may be up to about 80% of lithium perchlorate based on the total weight of the composition. It will be understood that substantially smaller amounts of the perchlorate may be employed in effective compositions, and the amounts are often in the region of about 4 or 5 to 15 or 16%.

The polymers in the novel products of this invention are the materials known as polyisocyanurates. The repeating unit of the polyisocyanurate polymer may be represented as follows:

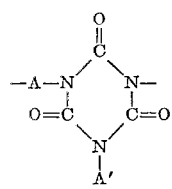

where A is a divalent organic radical and A' is an organic radical selected from monovalent radicals and divalent radicals bonded to another isocyanurate ring. If the polymer is prepared from isocyanate consisting essentially of diisocyanate, A' will be divalent; if a mixture of mono- and diisocyanates is used, it will be monovalent in at least some if not all of the repeating polymer units.

There may be at least ten of the above illustrated repeating units in the product.

One class of such isocyanurate repeating units particularly contemplated as characterizing the polymers in the products of this invention are those wherein A and A' are each divalent radicals including, for example hydrocarbon radicals which may be aliphatic, including saturated and unsaturated (olefinic) and cycloaliphatic, aromatic, or aliphatic-aromatic. For example, A and A' may be alkylene such as butylene, hexylene and the like; cycloaliphatic such as cyclohexylene; aromatic such as phenylene, tolylene, naphthylene and so forth; or alkylene arylene such as methylene bis(phenylene) and the like. Hetero atoms interrupting the hydrocarbon chains and non-interfering substituents on the chain are also contemplated: for example, A and A' may be an ether group such as —R—Y—R— wherein R is an alkylene group and Y is oxygen or sulfur; an amine group such as

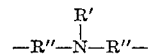

wherein R' is an alkyl group and R" is an alkylene group—an amide group such as

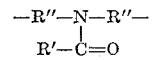

wherein R' is an alkyl group and R" is an alkylene group; a silane group such as

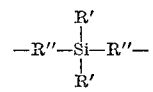

wherein R' is an alkyl group and R" is an alkylene group; a siloxy group such as

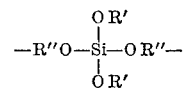

wherein R' is an alkyl group and R" is an alkylene group; a substituted alkylene group such as

wherein X is halogen, tertiary amino, cyano, N-disubstituted sulfonamide, alkoxy, or the like and R" is an alkylene group, and so forth; a substituted arylene group in which the substituents are for example halogen, nitro, nitroso, cyano, or the like; or a diarylene group which can be represented by the following formula:

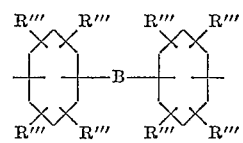

wherein R''' may be hydrogen, alkyl, nitro, nitroso, halogen, cyano, or the like and not more than two of the R''' groups for each phenylene group may be other than hydrogen and B may be alkylene, alkenylene, alkynylene, sulfur, oxygen, sulfone, silyl, or —$CH_2$—Z—$CH_2$— wherein Z may be a divalent cyclic group, for example, of the hydrocarbon type including the alicyclic or arylene.

Also contemplated are those polymers characterized by the above-illustrated isocyanurate ring wherein A is one of the kinds of groups stated above, and A' is a monovalent organic radical. In general, the characteristics of the group A' will then be the same as those stated, above, except that it will be monovalent. Thus for example, A' may be hydrocarbon including aliphatic (saturated or unsaturated, or cycloaliphatic), aromatic or alkylaryl. For example, it may be hexyl, decyl, or the like; cyclohexyl, cyclopentyl, dicyclopentadienyl and so forth; or phenyl, tolyl, xylyl, naphthyl, naphthylmethyl and so forth. It may also include hetero atoms and inert substituents, comprising for example an amine group such as

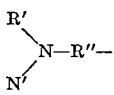

wherein R' is an alkyl group and R" is an alkylene group; an amide group such as

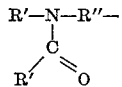

wherein R' is an alkyl group and R" is an alkylene group; a silane group such as

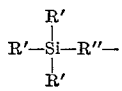

wherein R' is an alkyl group and R" is an alkylene group;

wherein X' is halogen, tertiary amino, cyano, N-disubstituted sulfonamide, alkoxy, or the like and R' is an alkyl group; a substituted aryl group such as

wherein X" is halogen, alkyl, nitro, nitroso, cyano, or the like, and Ar is phenyl, naphthyl or —Ar'—Z—Ar'— wherein Z is oxygen, sulfone, silyl, alkyl, alkenyl, alkynyl, etc. and Ar' is phenylene, naphthylene or

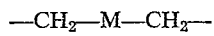

wherein M is a divalent cyclic hydrocarbon group such as alicyclic or arylene.

The polyisocyanates used to prepare the stated polymers are generally diisocyanates. Illustrative of useful diisocyanates are, for example, 1,6-hexane diisocyanates;
1,4-butane diisocyanates;
1,4-diisocyanato-2-butene;
β,β'-diisocyanatodiethylsulfide;
ω,ω'-diisocyanato dipropylether;
1,5-diisocyanato-2,2-dimethylpentane;
1,6-diisocyanato-3-methoxyhexane;
1,4-bis(3-isocyanatopropoxy)butane;
1,4-bis(isocyanatoethyl) cyclohexane;
4,4'-dicyclohexylmethanediisocyanate;
2,2-bis(4-isocyanatocyclohexyl)propane;
bis(4-isocyanato-2-methylcyclohexyl) methane;
4,4'-diisocyanatodiphenyl disulfide;
4,4'-azobenzene diisocyanate;
4-isocyanatophenyl ester of 4-isocyanatophenylsulfonic acid;
4,4'-benzophenone diisocyanate;
4,4'-diisocyanatodiphenylether;
1,2-bis(4-isocyanatophenoxy)ethane;
1,2-bis(4-isocyanatobenzenesulfonamido)ethane;
4,4'-stilbene diisocyanate;
2,2-bis(4-isocyanatophenyl)propane;
4,4'-diisocyanatodiphenylsulfone;
β,β'-bis(4-isocyanatophenoxy)diethylether;
cyclohexyl-bis-(4-isocyanatophenyl)methane;
4-nitrophenyl bis(4-isocyanatophenyl) methane;
2,2'-dimethyl-4,4'-diisocyanatodiphenyldisulfide;
α,α'-diisocyanato-p-xylene;
1,4-bis(2-isocyanatoethyl)benzene;
4,4'-bis(3-isocyanatopropyl) biphenyl;
4-isocyanatobenzylisocyanate;
1-(p-isocyanatophenyl)-3-isocyanato-butane;
4-isocyanatocyclohexyl-4-isocyanatophenyl methane,
and so forth.

When the polymerization of the diisocyanate is conducted in the presence of a monoisocyanate, for the purpose of this invention any monoisocyanate may be useful for the purpose of modifying the polymeric product. The monoisocyanates which are useful include, for example phenyl isocyanate;
para-tolyl isocyanate;
benzyl isocyanate;
phenylethyl isocyanate;
4-cyclohexylphenyl isocyanate;
4-nitrophenyl isocyanate;
4-chlorophenyl isocyanate;
3-cyanophenyl isocyanate;
4-methoxyphenyl isocyanate;
4-ethoxyphenyl isocyanate;
4-isocyanatoazobenzene;
ethyl isocyanate;
allyl isocyanate;
normal butyl isocyanate;
dodecyl isocyanate;
cyclohexyl isocyanate;
isobutyl isocyanate;
secondary butyl isocyanate;
2-isocyanato-ethylbenzene;
1-chloroethyl-2-isocyanate;
1-chlorohexyl-6-isocyanate;
1-cyanopropyl-3-isocyanate;
3-isocyanatopropoxycyclohexane;

etc. The monoisocyanate may be present in any amount relative to the diisocyanate. About 40 mole percent to 100 mole percent of monoisocyanate based on diisocyanate is generally useful.

The polymerization reaction is conducted in liquid phase in the presence of a suitable solvent. To be effective for the present purposes, the solvent will be one in which the monomeric isocyanate is miscible or soluble and further, one in which lithium perchlorate is sufficiently soluble for the present purposes. Generally, an oxidant amount of lithium perchlorate must be soluble in the amount of solvent employed. This amount may vary over wide limits for the purposes of the present invention. Generally about 2 to 20, and preferably about 8 to 10 parts by weight of solvent per part of monomer starting material are employed. As will be appreciated, an isocyanate functional group is reactive with active hydrogen, such as the active hydrogen of alcohols and of amines. Therefore, to avoid diversion of the isocyanate to reaction with such materials, the solvent chosen should be characterized by substantial inertness towards the isocyanate radical. Solvents having on the one hand inertness towards isocyanate groups and on the other hand solvent power for lithium perchlorate include as a particularly preferred class the amides in which the nitrogen atom is fully substituted. Especially preferred in this connection for use in practicing the present invention are for example N-dialkyl alkanecarbonamides such as dimethylformamide, dimethylacetamide, dibutylacetamide, diethylformamide, and the like. Similarly highly polar solvents free of reactive hydrogen such as dimethylsulfoxide can also be employed in this connection.

The polymerization reaction is catalyzed by means of a catalyst which induces ionic polymerization and may include a strong base of an organic or inorganic type as long as it does not effect adversely to any significant extent the desired product materials. The strong bases include, for example, tertiary amines, which may be alkyl, aromatic or heterocyclic, such as triethylamine, pyridine, 1,4-diazabicyclo[2.2.2.] octane, and the like; alkali or alkaline earth metal salts of low molecular weight carboxylic acids such as sodium carbonate, sodium acetate, potassium acetate, and the like; alkali metal alkoxides, such as sodium methoxide and potassium propoxide; organic tertiary phosphines, such as triethylphosphine, dimethylphenyl phosphine, and so forth.

From the compounds enumerated above it will be readily apparent to those skilled in the art that the catalyst is one which induces ionic polymerization and is designated for the purpose of this specification as an ionic polymerization catalyst in the generic sense. Generally it is found that the use of the catalyst facilitates obtaining shorter reaction times and the production of significant yields of polymer. The quantity of catalyst employed for the reaction may vary over wide limits, but in general about 1 to 50 mole percent, preferably about 1 to 5 mole percent of a strong base catalyst, such as the bicyclo compounds, or about 20 to 50 mole percent of a weak base catalyst such as triethylamine, based on monomer starting material, may be employed.

The catalysis of the polymerization reaction may be enhanced by the additional use of an organic epoxide. The organic epoxide is miscible and/or soluble with the diisocyanate monomer. The useful epoxides include aromatic and aliphatic compounds including, for example, epihalohydrins, such as epichlorohydrin; alkylene oxides such as propylene oxide and styrene oxide; alkenyl oxides such as butadiene mono- or dioxide, glycidyl esters such as ethyl glycidate, and so forth. The amount of organic epoxide employed with the ionic polymerization catalyst may vary considerably, but in general up to 100 mole percent, preferably about 5 to 10 mole percent of organic epoxide when using a strong base catalyst such as the bicyclo compounds, or preferably about 20 to 50 mole percent of organic epoxide when using a weak base catalyst such as triethylamine, may be used.

The polymerization temperature may vary from about ambient level to about 125° C. with the upper limit being determined by the fact that adverse effects tend to become noticeable above the same. Preferably, it is about 75–100° C. However, in some instances temperatures above 125° C. may be used. The temperature of reaction may vary with pressure, and atmosphere pressure is contemplated for the temperature range given above. If desired, the reaction may be conducted at subatmospheric or superatmospheric pressure, in which case the temperature may be varied outside the range herein given. The time required for the polymerization reaction to be substantially completed may vary considerably depending upon the type of monomer employed and may take for example up to about two hours for substantial completion. If desired, the reaction time may be shortened to suit the particular needs of a situation or for that matter lengthened, without departing from the scope of the present invention.

The products covered hereby are not limited to those prepared by polymerization of the isocyanate in the presence of an oxidant amount of lithium perchlorate dissolved in a solvent. The polymer may be prepared first and then combined with lithium perchlorate to dissolve it in the polymer. This can be done simply by heating and working the polymer gel produced by solution polymerization in the presence of the perchlorate, as for example by blending the gel with the perchlorate in suitable mixers or extruders or on a roll mill or the like at temperatures up to about 250° C.

Rather prolonged heating or standing in the presence of solvents may be needed to get the lithium perchlorate into solution in the amounts required to attain the results of this invention, and the method of polymerizing in the presence of an oxidant amount of lithium perchlorate dissolved in solvent is usually preferable.

As the foregoing has indicated, compositions provided in accordance with this invention may consist essentially of the polyisocyanurate polymer and lithium perchlorate in solid solution therein. Such compositions are useful as fuels and monopropellants: they will burn to form energetic gases or, if confined, burn explosively.

The solvent present during the polymerization of the isocyanate may remain present in the ultimate composition, where it will act as a polymer-modifying additive of the nature of a plasticizer. Other additional components may also be present in compositions embodying the present invention.

Thus, the novel homogeneous, single-phase combinations of lithium perchlorate with polymers provided by this invention can advantageously contain metal and hydride fuels. Thus for example, the propellant compositions may contain finely divided light metals and various hydrides thereof. Examples of these are beryllium, boron, magnesium, aluminum, magnesium hydride, aluminum hydride, the various solid hydrides, such as decaborane, alkylated decaboranes (ethyl alkylated decaborane), aluminum borohydride, lithium aluminum hydride, and the like. For example, the homogeneous mixture of lithium perchlorate and the polymer may contain up to about 20% by weight of the total composition of atomized aluminum (particle size about 20 microns). Preferably the aforesaid fuel material should be sufficiently fine to all pass a standard 100 mesh screen, and more preferably should pass a 200 mesh screen.

These light metal hydride high energy additives should preferably not exceed about 25 weight percent of the total composition, since the heavy combustion exhaust tends to lower performance of the solid propellant composition. It is often desirable to incorporate not more than from 5 to about 10 weight percent of said additives based on the total weight of the propellant composition.

Another group of additives which may be included in the system as part of the solids phase comprises oxidants, and other readily decomposable materials such as explosives. Illustrative of useful oxidants are, for example, ammonium perchlorate, ammonium nitrate and the like. Illustrative of useful explosive components are, for example, sodium azide.

The amount of oxidant employed in the solids phase will be adjusted in accordance with the amount of fuel to be burned in the composition and the amount of dissolved oxidant already supplied by the binder. Energetic, gas-supplying decomposable materials not requiring oxidant will usually be employed in gas-deficient systems, and the amount thereof adjusted to supply gas volume sufficient to take up thermal energy available so as to maximize the specific impulse of the system.

Referring to use of the presently provided compositions, when these are polymerization cast directly in a rocket motor, they will generally exhibit adhesive properties, and thereby adhere in polymerization to the cylinder in which they are cast. Due to this adhesive quality it may be desirable for a core insert to be employed to provide the desired internal cavity to effect proper radial burning of the propellant composition. This may be fabricated from or coated with a material such as polyethylene or polytetrafluoroethylene in order to provide ready release of the insert when polymerization is terminated.

The solid propellant may also be produced by extrusion for insertion in small bore rocket cases. In this case, a small amount of catalyzed liquid polymer composition can first be added to the cylinder case such that the insertion of the extruded mass will displace the liquid polymer, forcing it to rise in the annular space between the extrusion mass and the cylinder wall, whereby the inserted mass is securely bonded within the case. This liquid polymer can be of similar composition to the propellant composition insert, or any other suitable polymer composition which can be readily cured at suitable temperatures, below about 200° C., such as, for example, epoxy resins, polysulfide rubbers and the like.

The lithium perchlorate polymeric compositions of this invention burn vigorously and relatively uniformly when ignited and are useful as a solid propellant for rockets including short range ballistic weapons such as aircraft and artillery rockets and long range strategic missiles, wherein they may be the sole propellant or be employed in one or more stage of a multi-stage rocket system. The aforesaid compositions are also useful for rocket assisted takeoff, as boosters, sustainers and pyrotechnics. When confined the aforesaid compositions also are particularly valuable as explosives.

The invention is illustrated but not limited by the following examples.

Example 1

15 parts by volume of dimethylformamide are added to 15 parts by volume of toluene diisocyanate, and then 2 parts by weight of lithium perchlorate are dissolved in the mix. To catalyze polymerization, 5 parts by volume of epichlorohydrin and a small amount of pyridine are added. In five minutes a gel has set up.

Example 2

A mixture is prepared of 10 parts of toluene diisocyanate and 14 parts lithium perchlorate. 50 parts of dimethylformamide are added and the mixture is stirred. The lithium perchlorate dissolves. Now catalytic amounts of epichlorohydrin and pyridine are added. Bubbles appear and a slight hazing. On standing at room temperature a wax-like hazing solid is formed.

While the invention has been illustrated with reference to various specific preferred embodiments thereof it is to be appreciated that modifications and variations can be made without departing from the scope of the invention which is limited only as defined in the appended claims.

What is claimed is:

1. The method of preparing polymeric solid solutions of an oxidant amount of lithium perchlorate and polymer in the same homogeneous phase which comprises polymerizing an isocyanate monomer to a polyisocyanurate in the presence of an oxidant amount of lithium perchlorate dissolved in an inert organic solvent.

2. The mehod of claim 1 wherein said isocyanate monomer consists essentially of diisocyanate.

3. The method of claim 2 wherein said diisocyanate is aromatic diisocyanate.

4. The method of claim 1 wherein said solvent is a N-dialkyl alkanecarbonamide.

5. The method of claim 4 wherein said solvent is dimethylformamide.

6. The method of preparing polymeric solid solutions of an oxidant amount of lithium perchlorate and polymer in the same homogeneous phase which comprises polymerization of an aromatic diisocyanate to a polyisocyanurate in the presence of an oxidant amount of lithium perchlorate dissolved in dimethylformamide.

7. A polymeric solid solution of an oxidant amount of lithium perchlorate and a polyisocyanurate in the same homogeneous phase.

8. The composition of claim 7 wherein said solid solution is a gel including solvent.

9. The composition of claim 7 wherein said polyisocyanurate is a polymer of toluene diisocyanate.

10. A propellant composition comprising the product described in claim 7, said composition including at least sufficient oxidant to make combustion of said system self-supporting.

References Cited

UNITED STATES PATENTS

| | | | |
|---|---|---|---|
| 3,054,702 | 9/1962 | Stengel et al. | 149—19 |
| 3,002,830 | 10/1961 | Barr | 149—83 X |
| 3,055,781 | 9/1962 | Yamamoto | 149—83 X |
| 3,050,423 | 8/1962 | Hudson | 149—19 |

BENJAMIN R. PADGETT, *Primary Examiner.*

OSCAR R. VERTIZ, REUBEN EPSTEIN, *Examiners.*